United States Patent [19]

Cole et al.

[11] Patent Number: 4,995,343
[45] Date of Patent: Feb. 26, 1991

[54] FEEDER APPARATUS

[75] Inventors: Theodore J. Cole; Ray E. Swartzendruber, both of Syracuse, Ind.

[73] Assignee: CTB, Inc., Milford, Ind.

[21] Appl. No.: 302,015

[22] Filed: Jan. 26, 1989

[51] Int. Cl.$^5$ .......................................... A01K 39/012
[52] U.S. Cl. .................................... 119/53; 119/52.1
[58] Field of Search .................... 119/52.1, 52.4, 53, 119/53.5, 54, 55

[56] References Cited

U.S. PATENT DOCUMENTS

| | | | |
|---|---|---|---|
| 2,667,858 | 2/1954 | Lassotti | 119/52.1 |
| 2,884,899 | 5/1959 | Jackes et al. | 119/52.1 |
| 2,941,506 | 6/1960 | Fulton | 119/52.1 |
| 3,012,539 | 12/1961 | Warren | 119/52.1 |
| 3,230,933 | 1/1966 | Myers et al. | 119/53 |
| 3,386,690 | 6/1968 | Hostetler | 119/53 |
| 3,511,215 | 5/1970 | Myers | 119/53 |
| 3,717,126 | 2/1973 | Falcone et al. | 119/52.4 |
| 3,811,412 | 5/1974 | Murto et al. | 119/53 |
| 3,911,868 | 10/1975 | Brembeck | 119/53 |
| 4,070,990 | 1/1978 | Swartzendruber | 119/53 |
| 4,476,811 | 10/1984 | Swartzendruber | 119/53 |
| 4,834,026 | 5/1989 | Brembeck et al. | 119/53 |

FOREIGN PATENT DOCUMENTS 854002  11/1960  United Kingdom ............... 119/52.1

Primary Examiner—John G. Weiss
Attorney, Agent, or Firm—Richard Bushnell

[57] ABSTRACT

A versatile feeder for use in an automated feeding system of the type used to raise domestic birds and animals on a commercial scale comprising a pan member for containing and presenting feed for consumption, feeder tube means disposed above said pan member and connectible with a feed conveyor source, said feeder tube means having upper and lower feed gates for directing feed supplied to said feeder tube means from said feed conveyor source into said pan member, and rotatable collar means surrounding said feeder tube means for controlling a first feed flow directed through said upper feed gate into said pan member independently of a second feed flow directed through said lower feed gate into said pan member. Associated wing members may also be provided on said rotatable collar means to prevent access to said first feed flow by said consuming birds and animals prior to the feed reaching a limited feeding area defined within the pan member. The upper feed gate may also be positioned in said feeder tube means at a sufficient height relative to the pan member such that feed flowing from the upper feed gate will develop a feed pile within the pan having an angle of repose which will cause the feed to spill beyond the pan member and onto the surface from which the birds or animals are feeding.

11 Claims, 3 Drawing Sheets

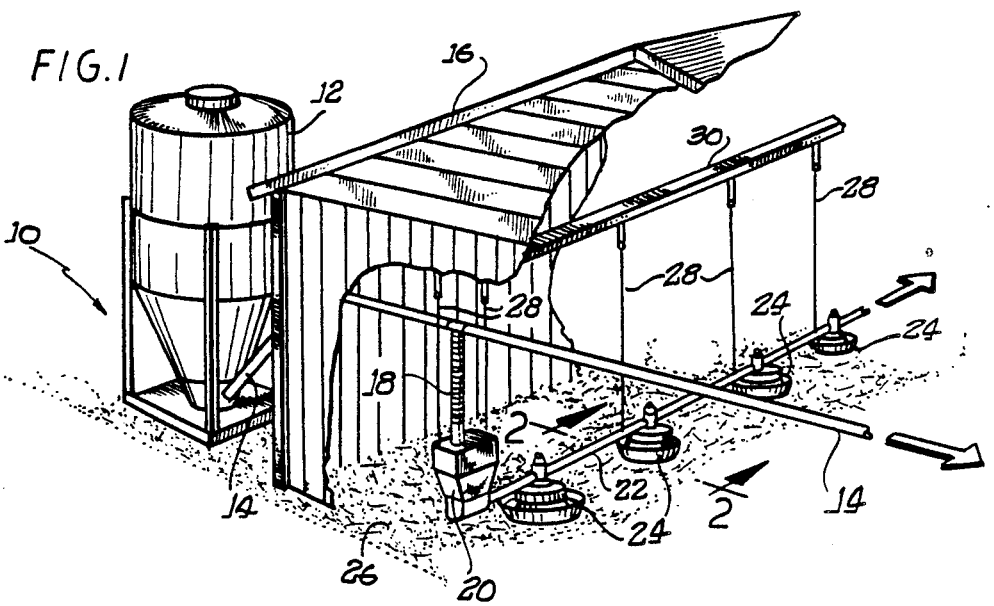
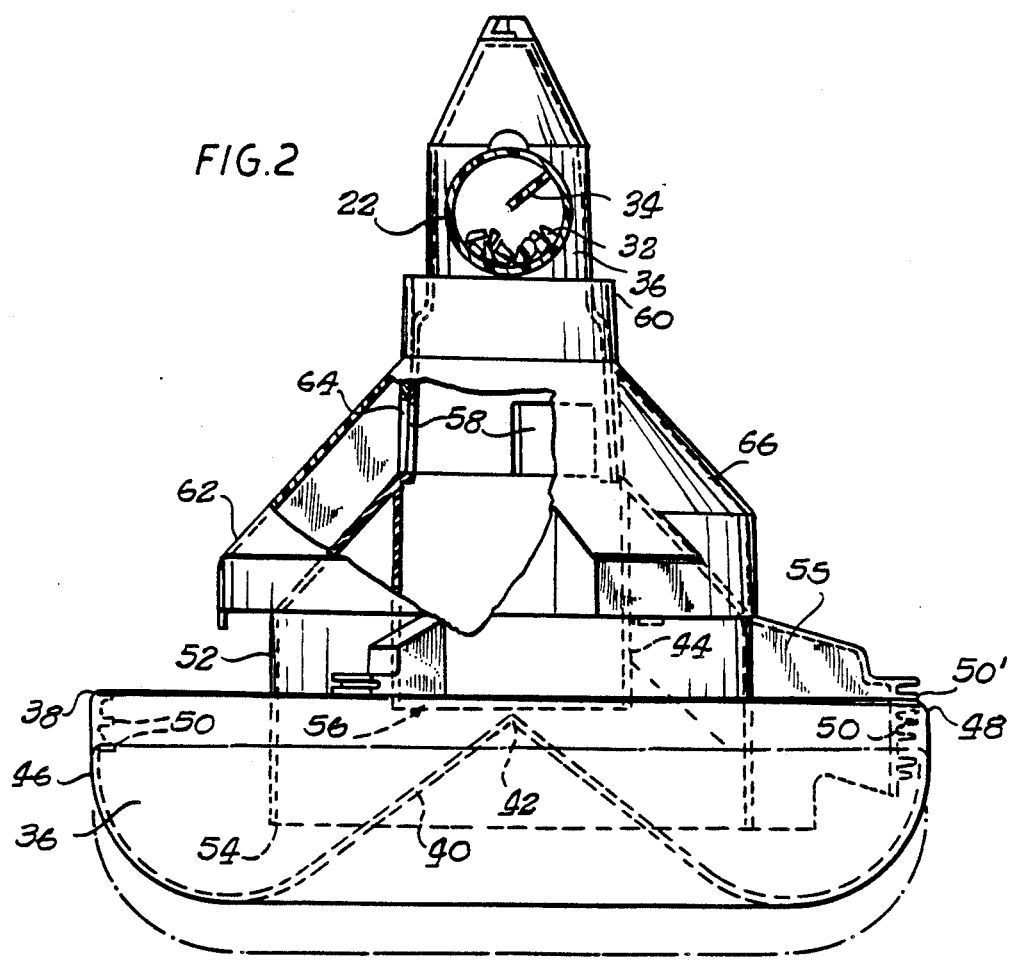

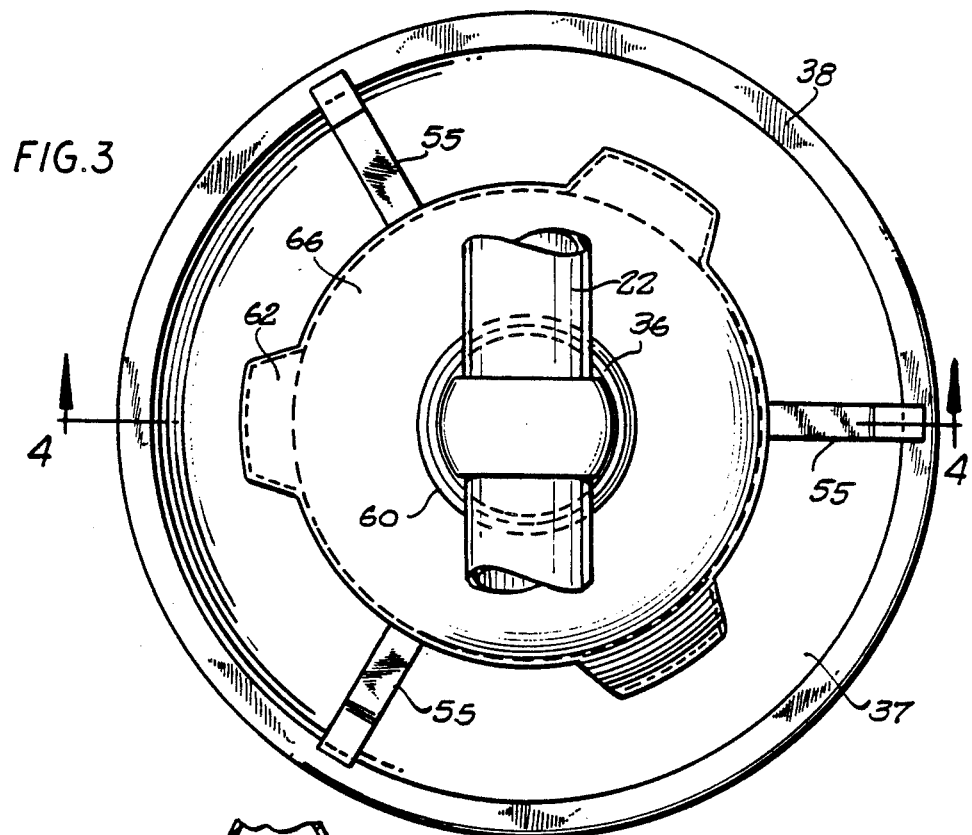
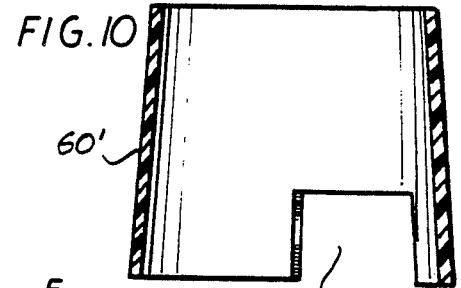
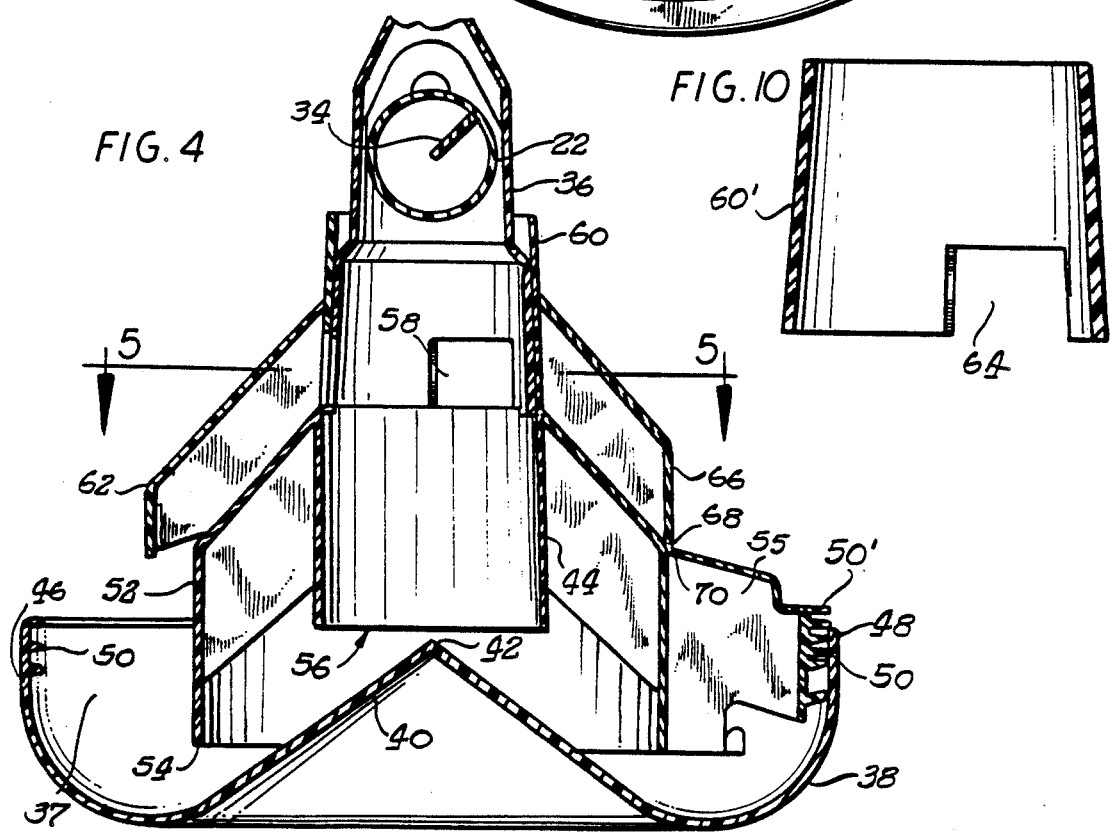

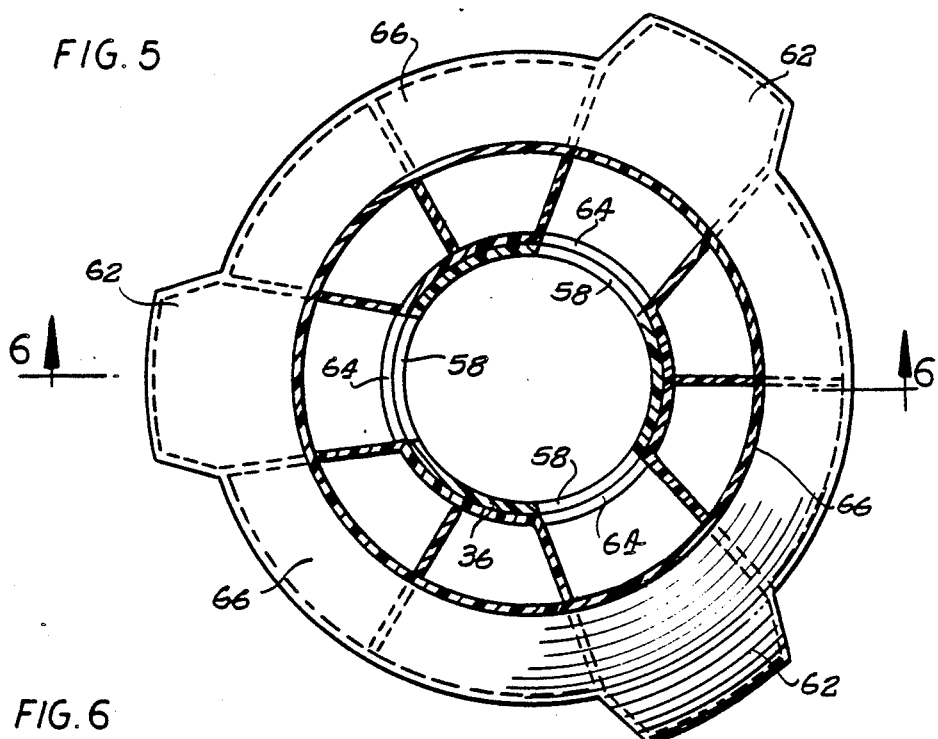
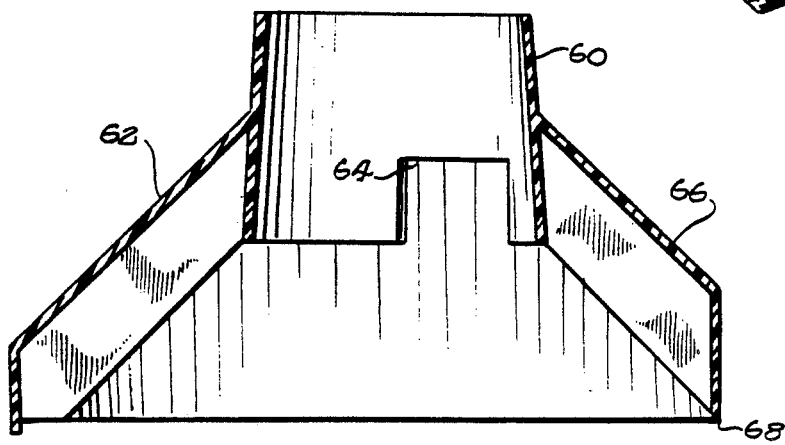
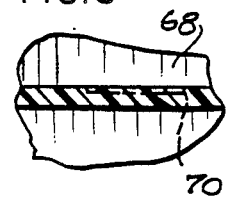
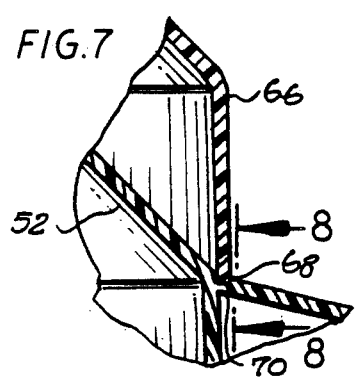
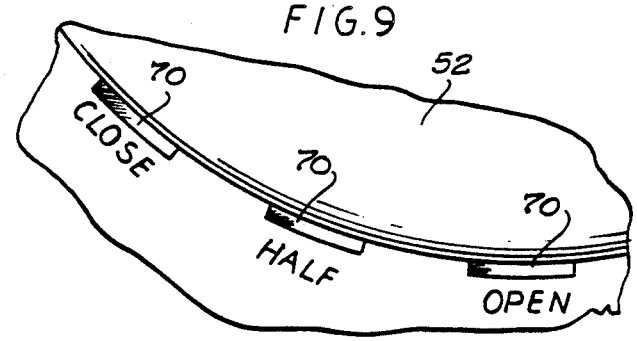

FEEDER APPARATUS

BACKGROUND OF THE INVENTION

This invention relates in general to feeding systems used for raising poultry and other domestic birds and animals on a commercial scale. In particular, this invention relates to the feeder apparatus portion of such feeding systems which deliver and present the feed to the point of consumption.

In today's competitive marketplace, animal husbandry operations utilizing automatic feeding systems are commonplace. The automated systems provide greater control over feeding frequencies and the quantities of feed delivered, and thereby increase production quality while simultaneously saving on labor costs. One of the most important system components of an effective automated feeding system is the feeder unit utilized to deliver and present the feed to consuming scores of birds and animals. Ideally, a single design of feeder could be used for feeding a wide variety of animals, in both kind and dimension. However, due to the number of different conditions which must be satisfied when feeding a particular type and/or size of bird or animal, prior art feeders have not attained satisfactory versatility in this regard.

For example, in feeding brood-size chickens or turkeys, it is normally desirable to maintain high feed levels within the feeder units in order to facilitate access to the feed by the young birds. However, when the birds quickly grow larger, high feed levels may allow the birds to spill feed out of the feeder and onto another surface, which may be acceptable in certain applications, but unacceptable or undesirable in others. Upon still further growth, it may be desirable to raise the feeders off the surface upon which the birds are feeding from, and still be able to fully control the feed levels within the feeder, as well as whether the consuming birds or animals can cause feed to spill from the feeder unit.

SUMMARY OF THE INVENTION

Accordingly, it is a general objective of this invention to provide a feeder for poultry and like domestic birds and animals which can meet a wide variety of feeding conditions and requirements and thereby be suitable for feeding a wide variety of domestic birds and animals.

Another objective of the present invention is to provide a feeder which can always maintain high levels of feed within the feeder to facilitate feeding by relatively small birds or animals.

A related object is to provide a feeder which, while maintaining high feed levels, can prevent the consuming birds or animals from causing feed to spill from the feeder.

Still another related object is to provide a feeder which can present high feed levels for consumption and/or prevent spilling regardless of the vertical relationship between the location of the feeder and the surface from which the birds or animals are feeding.

Still another object of the present invention is to provide a feeder which can operate to spill feed beyond the feeder when so desired.

Summarily stated, the present invention comprises a feeder for poultry and other domestic birds and animals comprising a pan member for containing and presenting feed for consumption, feeder tube means disposed above said pan member and connectible with a feed conveyor source, said feeder tube means having upper and lower feed gates for directing feed supplied to said feeder tube means from said feed conveyor source into said pan member, and rotatable collar means surrounding said feeder tube means for controlling a first feed flow directed through said upper feed gate into said pan member independently of a second feed flow directed through said lower feed gate into said pan member.

The rotatable collar means may include associated wing members to prevent access to said first feed flow by the consuming birds or animals other than in a limited area within said pan member.

It may also be desirable to position the upper feed gate at a sufficient height in the feeder tube means relative to the pan member such that feed flowing therefrom will develop a feed pile within the pan having an angle of repose which will cause feed to spill beyond the pan member and onto the surface from which the birds or animals are feeding. In this case the feeder may or may not also include the rotatable collar means and/or the associated wing members discussed above.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following descriptions taken in connection with the accompanying drawings in which like reference numerals identify like elements, and in which:

FIG. 1 is a perspective view of a typical automated feeding system with which the present invention would normally be used;

FIG. 2 is a sectional view of the invention taken substantially in the plane of line 2—2 shown in FIG. 1, a portion of the upper half of which is partially broken-away;

FIG. 3 is a plan view of the feeder of the present invention showing the interconnection between the feeder and a branch line of the automated feeding system;

FIG. 4 is a sectional view taken substantially in the plane of line 4—4 of FIG. 3;

FIG. 5 is a sectional view taken substantially in the plane of line 5—5 in FIG. 4;

FIG. 6 is a sectional view taken substantially in the plane of line 6—6 in FIG. 5;

FIG. 7 is an enlarged fragmentary view showing the relationship between a rotatable collar portion of the feeder and a dome member portion of the feeder;

FIG. 8 is a sectional view taken substantially in the plane of line 8—8 of FIG. 7;

FIG. 9 is an enlarged fragmentary plan view of the component relationship shown in FIG. 8; and FIG. 10 shows an alternative form of the rotatable collar means portion of the present invention.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning now to the drawings, FIG. 1 shows an automated feeding system 10 of the type to which the present invention relates. As illustrated, the feeding system 10 includes a bulk feed storage bin 12 which supplies feed by way of a main supply line 14, into a feed house 16 wherein the remaining components of the system 10 are located.

From the main supply line 14, the feed travels into a drop tube 18 (several of which may be incorporated in a system of this type, but only one of which is shown) and then into intake cups 20 from which the feed is distributed into branch lines 22, whereon the individual feeders 24 are positioned. As will be discussed in greater detail below, the location of the feeders 24 with respect to a feeding surface 26 (such as the floor of the feed house 16), can usually be vertically adjusted in this type of feeding system 10. For this purpose, cables 28 are suitably arranged between feed house joists 30 and the branch lines 22 and intake cups 20 enabling the feeders 24 to either rest directly on the feeding surface 26 or be suspended thereabove at a selectable vertical distance. It should be noted that in order to provide this vertical adjustability, drop tubes 18 are preferably of the type which can be compressed and extended over an extended period of time without being damaged.

Directing attention now to FIG. 2, there is shown a sectional elevation of the feeder 24 of the present invention taken along line 2—2 of FIG. 1. Here it can be seen that feed granules 32 are pushed along branch lines 22 by an auger element 34. When the feed 32 reaches an intersection point with one of the feeders 24, the feed falls under its own weight into a feeder tube means 36 which directs the feed downwardly towards a pan member 38.

As can also be seen in FIG. 4, the pan member 38 is preferably bowl-shaped and includes a conical bottom 40 having a vertex 42 substantially centered below a distal end 44 of the feeder tube 36. A sidewall 46 of the pan member 38 terminates at a rim 48 which is provided with teeth 50 for interconnection with the feeder 24 as explained below. Further in accordance with the invention, a dome member 52 is surroundingly engaged with the feeder tube 36 about a lower portion thereof as shown in both FIGS. 2 and 4. So engaged, a bottom edge 54 of the dome 52 extends vertically below the distal end 44 of the feeder tube 36 and thereby defines a limited annular feeding area 37 extending between the dome 52 and the pan sidewall 46. Besides limiting the area within the pan 38 from which birds or animals can feed, the dome 52 also serves to prevent roosting upon the feeders 24 due to its inclined shape.

Interconnection and vertical adjustability between the pan member 38 and the dome member 52 is provided by utilization of spokes 55 extending outwardly from the dome member 52 as seen from above in FIG. 3. The spokes 54 terminate with teeth 50' which can be easily intermeshed with the teeth 50 provided on the pan member rim 48.

In operation, the feed granules 32 being urged along branch line 22 by auger 34 will fall into each feeder 24 by way of the feeder tubes 36. In keeping with one of principle objects of the invention, once inside the feeder tube 36, the feed can be directed into the pan member 38 in either of two separate and independent ways. In the first instance, feed granules 32 will fall completely through feeder tube 36 and emerge from an open bottom of the tube, hereinafter referred to as a lower feed gate 56. The feed will then strike conical pan bottom 40 and flow downwardly and outwardly into annular feeding area 37. If the feed granules 32 enter the pan member 38 only by way of the lower feed gate 56, the level of feed within the pan 38 will be limited to the level at which the bottom edge 54 of the dome 52 has been positioned. Feed levels within the pan member 38 developed by just the lower feed gate 56 are normally best-suited for relatively larger birds or animals which are of sufficient size to reach the feed presented in this manner. From the description of the feeder 24 thus far provided, it should be apparent that adjustment of the interconnection between the pan member 38 and the dome means 52 will also change the vertical relationship between the distal end 44 of the feeder tube 36 and the pan bottom 40 and thereby serve to adjust the size of the lower gate 56. Moreover, it should be noted that the lower gate 56 can be substantially closed by positioning the teeth 50 at their highest interconnection position with respect to teeth 50'.

Alternatively, (or in conjunction with the lower feed gate 56), feed granules 32 can also be directed into the pan member 38 by way of an upper feed gate 58. As shown in FIGS. 2 and 4, the upper feed gate 58 comprises at least one opening in the feeder tube 36 at a point above the location where dome means 52 is positioned. Feed flowing from the upper feed gate 58 will develop a feed pile within the pan member 38 which provides easier access to the feed by smaller birds and animals.

In keeping with another one of the principle objects of the invention, fully independent operation of both the lower and upper feed gates 56 and 58 is accomplished by providing a rotatable shield 60 on the feeder 24 as seen in FIGS. 4 through 6 to block the upper feed gate 58 when only the lower feed gate 56 is needed. The rotatable shield 60 may also include a wing member 62 corresponding to each aperture formed in the feeder tube 36 which forms the upper feed gate 58, and shield cut-outs 64 designed to come into and out of alignment with the upper feed gate 58 when the shield 60 is rotated relative to the feeder tube 36. The wing members 62 are designed to prevent the consuming birds and animals from accessing the feed granules 32 flowing from the upper feed gate 58 until the feed reaches the annular feeding area 37, and also function to prevent roosting on the feeder 24.

In the preferred embodiment illustrated, the wing members 62 are connected by webs 66 which also serve to prevent roosting and can be designed so that a tab 68 extends from a lower edge thereof to interlock in grooves 70 formed in the dome means 52 thereby temporarily locking the relationship between the upper feed gate 58 and the shield cut-outs 64 in, for example, the open, half-open, and closed positions as shown in FIGS. 7 through 9.

A modified version of the rotatable shield 60' is shown in FIG. 10. In this version, the wing members 62 and webs 66 do not exist, as it is intended for use in applications wherein the advantage of these features is not required. The rotatable shield 60' is otherwise identical to the earlier discussed version 60 and the provision of means for locking the upper feed gate 58 in open, partially-opened and closed positions would be obvious to one skilled in the art.

In either of the embodiments described, both the lower and upper feed gates 56 and 58 are fully operable independent of one another. Moreover, the manner of operation of both the gates 56 and 58 is not effected by the position of the feeder with respect to the feeding surface 26. That is, whether the feeder is resting on surface 26 or suspended thereabove on cables 28, both feed gates are fully operable on an independent basis.

In accordance with a further important aspect of the invention, the upper feed gate 58 can be positioned in the feeder tube 36 at a point of sufficient elevation with respect to pan member 38 so that the angle of repose of the feed pile developed in the pan causes feed to spill beyond the pan rim 48 and onto the feeding surface 26. In this regard, it should be recalled that any heap of loose solid material, such as feed, will have an angle of maximum slope with respect to the horizontal at which the feed will stand in a pile without sliding. In order to achieve the objective of spilling feed beyond the pan member 38 as stated above, this so-called "angle of repose" for the common type of feed products normally used in this type of application must be known and utilized to determine the height at which the upper feed gate 58 should be positioned. That is, if a right triangle is envisioned being formed between the feeder tube 36 and the feeding surface 26, (the hypotenuse of which extends from the upper feed gate 58 to the horizontal), the upper feed gate 58 must be formed high enough in the feeder tube 36 so that the hypotenuse will not intersect any point along the vertical line represented by the pan member sidewall 46, up to and including the pan rim 48.

This feature again illustrates the versatility of use of the feeder 24 provided. If the upper feed gate 58 is positioned in this manner, the feed pile formed by feed granules 32 will extend beyond the rim 48 and spill onto the feeding surface 26, which may be a desirable method of feeding certain types of poultry. However, such spilling would usually be unacceptable in turkey applications where it is preferable to keep the feeding surface 26 clean. Thus, use of the rotatable shield 60, with wing members 62, in this embodiment has the additional advantage of preventing feed from spilling beyond the rim 48.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study.

I claim:

1. A feeder for poultry and other domestic birds and animals comprising, a pan member for containing and presenting feed for consumption, feeder tube means disposed above said pan member and connectible with a feed conveyor source, said feeder tube means having upper and lower feed gates for directing feed supplied from said feed conveyor source into said pan member, and rotatable collar means surrounding said feeder tube means for controlling a first feed flow directed through said upper feed gate into the pan member independently of a second feed flow directed through said lower feed gate into said pan member, said rotatable collar means independently controlling said first feed flow when said feeder, including said pan member, is resting on a feeding surface and when said feeder is elevated above said feeding surface.

2. The feeder recited in claim 1, wherein said upper feed gate comprises at least one opening formed in said feeder tube means, and said rotatable collar means comprises a cylindrical shield having at least one opening formed therein to correspond with the opening formed in said upper feed gate such that said shield opening can be rotated into and out of alignment with said upper feed gate.

3. The feeder recited in claim 2, wherein said rotatable collar further comprises a wing member associated with said shield opening for preventing access to said first feed flow from said upper feed gate by said birds and animals until the feed has fallen into said pan member, and for deterring said birds and animals from bodily climbing into said pan member or roosting upon said feeder.

4. The feeder recited in claim 1, wherein said feeder includes dome means attached to and surrounding said feeder tube means below said upper feed gate, said dome means projecting downwardly into said pan member for a selectable, predetermined distance thereby defining a limited feeding area within said pan member accessible to said birds and animals and controlling a feed level within the pan member developed by said second feed flow eminating from said lower feed gate.

5. The feeder recited in claim 4, wherein said dome means further comprises spoke means for adjustably coupling said dome means with said pan member and thereby selectively fixing the vertical relationship between the dome means and the pan member.

6. The feeder recited in claim 1, wherein the pan member has an upstanding cylindrical sidewall and a conical bottom, a vertex of which is substantially centered below said lower feed gate which comprises an open lower end of said feeder tube means such that said second feed flow will fall onto said conical bottom and continue to descend downwardly and outwardly into said pan member.

7. A feeder for poultry and other domestic birds and animals comprising a pan member for containing and presenting feed for consumption, feeder tube means disposed above said pan member and connectible with a feed conveyor source, said feeder tube means having upper and lower feed gates formed therein for directing feed supplied from said feed conveyor source into said pan member, said upper feed gate comprising at least one aperture formed in said feeder tube means at a sufficient vertical height relative to the pan member to develop a feed pile within said pan member having an angle of repose which will cause feed to spill beyond the pan member, a rotatable collar means surrounding said feeder tube means at said upper feed gate thereof for selectively varying or completely halting a first feed flow being directed through said upper feed gate independently of a second feed flow being directed through said lower feed gate, wherein the rotatable collar means comprises a cylindrical ring having aperture means formed therein.

8. The feeder recited in claim 7, wherein said rotatable collar means further comprises a wing member associated with said aperture means for preventing access to said first feed flow from said upper feed gate by birds and animals until the feed has fallen into said pan member.

9. The feeder recited in claim 7, wherein said feeder includes dome means attached to and surrounding said feeder tube means below said upper feed gate, said dome means projecting downwardly into said pan member for a selectable, predetermined distance and thereby defining a limited feeding area within said pan member accessible to said birds and animals and controlling a feed level within the pan member developed by said second feed flow eminating from said lower feed gate.

10. The feeder recited in claim 9, wherein said dome means further comprises spoke means for adjustably coupling said dome means with said pan member and thereby selectively fixing the vertical relationship between the dome means and the pan member.

11. The feeder recited in claim 7, wherein the pan member has an upstanding cylindrical sidewall and a conical bottom, a vertex of which is substantially centered below said lower feed gate which comprises an open lower end of said feeder tube means such that said second feed flow will fall onto said conical bottom and thereafter flow downwardly and radially outward into said pan member.

* * * * *